Patented July 28, 1953

2,647,096

UNITED STATES PATENT OFFICE 2,647,096

POLYVINYL CHLORIDE COMPOSITION CONTAINING A UTAH COAL RESIN

Lino J. Radi, Somerville, N. J., assignor to Interchemical Corporation, New York, N. Y., a corporation No Drawing. Application December 6, 1951, Serial No. 260,341

7 Claims. (Cl. 260—27)

This invention relates to the processing of polyvinyl chloride plastics and aims particularly to improve the processing characteristics thereof so that such plastics can be more readily handled in customary mixing, milling, extruding, and molding equipment. More particularly, the invention is concerned with the improvement of the milling properties of plastic compositions containing polyvinyl chlorde, including polyvinyl chloride polymers containing up to 25% of copolymerized vinyl acetate.

While polyvinyl chloride plastics are not new, their processing has presented difficulties which render the working thereof prolonged and expensive. Furthermore, the processing of such plastics in conventional equipment frequently results in milled stock lacking in many of the desired physical characteristics.

It has now been discovered that the processing characteristics of vinyl plastics can be appreciably improved by incorporating therewith limited amounts of a Utah-type coal resin. In particular, the inclusion of about 5% to 25%, based on the vinyl plastic, of such coal resin has been found to reduce the time and cost of milling of vinyl plastics and compounding them with other ingredients. By milling polyvinyl plastics with Utah-type coal resin in accordance with the invention the milling of the plastic can be carried out in shorter time and at lower temperatures to obtain milled products having as good or better properties than the milled products obtained according to prior art teachings. For instance, the milled products have improved flow properties at molding temperatures, and have less plasticizer "spew" or loss, particularly at elevated temperatures than conventionally milled polyvinyl chloride plastic. Furthermore, the milled products exhibit less distortion at elevated temperatures and less stiffening than the same plastics milled according to prior art teaching. Also, in many instances, improved elongation, tensile strength, hardness, tear resistance, abrasion resistance and electrical properties are obtained.

The coal resin which is to be incorporated with the polyvinyl chloride plastic is obtained from resin-bearing coals such as those found in extensive deposits in Utah. These coals, particularly those obtained from the Utah deposits, contain substantial percentages (up to 5% and more) of such resinous material, which may be separated and recovered therefrom in various manners. In accordance with the present invention, the resin is preferably employed in a substantially coal-free condition. It can advantageously be recovered from the coal by the following two-stage procedure:

The resin is first separated from the bulk of the coal by aqueous flotation as described, for example, in Green U. S. Patent 1,773,997. The resulting resin concentrate, which still contains an appreciable proportion of coal (up to 15 to 20% admixed therewith, is then dissolved in a solvent composed essentially of saturated hydrocarbons having 6 or less carbon atoms. The insoluble coal is separated from the resulting resin solution by filtration, and the resin itself is then recovered in a substantially coal-free condition by vaporization of the solvent from the solution. If a light-colored resin product is desired, the resin solution may be filtered through a bed of activated clay or the like.

A typical Utah-type coal resin, recovered in this manner, is soluble in ethers, petroleum and coal-tar hydrocarbons, and vegetable oils, partially soluble in esters and ketones, and insoluble in the lower alcohols. The following physical and chemical characteristics are typical of a representative Utah-type coal resin which has been recovered by extraction with hexane:

| | |
|---|---|
| Specific gravity | 1.03–1.06 |
| Softening point (capillary method) | 160° C. |
| Refractive index | 1.544 |
| Physical state | Brittle solid |
| Acid value | 6–11 |
| Iodine number (Wijs) | 140–150 |
| Molecular weight (average) | 732 |
| Analysis: | |
|     Carbon | 87.04% |
|     Hydrogen | 11.00% |
|     Nitrogen | 0.96% |

The polyvinyl chloride plastic compositions containing coal resin in accordance with the invention can be readily compounded during processing with pigment, fillers, and the like. Again, the addition of Utah-type coal resin does not adversely affect the cure of such milled vinyl plastic compositions.

The invention is applicable to polyvinyl chloride resins or plastics generally. However, the relatively high molecular weight, relatively insoluble types of vinyl plastics are preferred, e. g. polyvinyl chloride and vinyl chloride copolymers containing up to 3 to 7% copolymerized vinyl acetate and having a molecular weight of 15,000 or above.

The Utah-type coal resin is preferably used in an amount ranging from about 5% to about 25% by weight of the polyvinyl chloride plastic. Within this range occurs the most significant increase in processability of the plastic, and the products obtained have the most desirable characteristics. Less than 5% of coal resin may be used, but then the improved processability of the plastic is generally not sufficient to permit the ready incorporation therewith of the desired amounts of pigments, fillers, and other additives. More than 25% of coal resin based on the plastic may also be employed, but then the products are generally too boardy for many applications. Depending upon the intended applications of the plastic, sufficient coal resin should be incorporated with it to improve its processability and to enable it to be broken down on milling to the extent necessary. The coal resin may be incorporated with the plastic either before the latter is passed through a roll mill or other plastic or rubber handling equipment or during the milling of the vinyl plastic, with or without the addition of plasticizers and other additives.

As is customary in the vinyl plastics field, the plastic may be compounded with such additives as plasticizers, fillers, pigments and the like. Moreover, the incorporation of such conventional additives as fillers and pigments is facilitated by the use of the coal resin additive in accordance with our invention.

The following typical examples are presented to illustrate this invention.

EXAMPLE I

|  | Experiment No. | | | | |
| --- | --- | --- | --- | --- | --- |
|  | A | B | C | D | E |
| Vinylite VYNW (93–95% Vinyl chloride copolymer with vinyl acetate, 24,000 average Mol Wt.) | 100 | 100 | 100 | 100 | 100 |
| Dioctyl phthalate (plasticizer) | 50 | 50 | 50 | 50 | 50 |
| Utah coal resin | 0 | 5 | 10 | 15 | 25 |

All ingredients were premixed then mixed on a 6" x 12" laboratory mill at a roll temperature of 260° F. for a total mixing for each batch of about 25 minutes, except for Experiment A which required about 35 minutes. The batch temperatures at the point of dispersion were recorded as 275°–280° F. The batches were sheeted from the mill in thickness of a quarter inch and allowed to rest overnight. All batches were press molded on a Carver press at 300° F. for 5 minutes. All batches showed good mold flow with the exception of batch A which had very poor mold flow. Samples measuring 6" x 1" were placed in an air circulating oven for 96 hours at 212° F. Samples were examined at intervals. Sample A darkened after 4 hours, became less flexible after 8 hours, and stiffened considerably after 48 hours. All other samples showed no change in color for the first 16 hours, but turned black by the end of 24 hours. Flexibility was unchanged at the end of 96 hours for samples B, C, D, and E. Table I shows general heat ageing properties at the end of 96 hours.

TABLE I

*Heat ageing properties*

|  | A | B | C | D | E |
| --- | --- | --- | --- | --- | --- |
| Color | Darkened | Black | Black | Black | Black |
| Gloss | Dull | High | High | High | High |
| Distortion | Considerable | None | None | None | None |
| Flexibility | Very stiff | Good | Good | Good | Good |

Samples measuring 6" x 1" were conditioned at room temperature for 24 hours in a desiccator. The samples were then weighed, then suspended in an air circulating oven for 96 hours at 212° F. The loss in weight of the various samples is given in Table II. This loss in weight is a measure of the loss of plasticizer, or degree of plasticizer "spew."

TABLE II

| Samples from Example I | Loss in Weight, Percent |
| --- | --- |
| A. (No coal resin) | 27 |
| B. (10 g. coal resin per 100 g. plasticizer) | 19 |
| C. (20 g. coal resin per 100 g. plasticizer) | 17.2 |
| D. (30 g. coal resin per 100 g. plasticizer) | 16.8 |
| E. (50 g. coal resin per 100 g. plasticizer) | 17.8 |

Table III shows abrasion resistance, as conventionally determined, using the Tauber Abraser-Calibrase Wheel GS-17. Figures given represent the loss in milligrams per 1,000 cycles at a 1,000 gram load.

TABLE III

| Sample from Example I | First Thousand Cycle | Second Thousand Cycle | Third Thousand Cycle |
| --- | --- | --- | --- |
| A | 35 | 62 | 70 |
| B | 30 | 53 | 62 |
| C | 30 | 57 | 60 |
| D | 32 | 48 | 52 |
| E | 33 | 48 | 52 |

The following compositions represent typical formations for calendered stock.

EXAMPLE II

| Composition | I | II | III | IV | V | VI |
| --- | --- | --- | --- | --- | --- | --- |
| Coal resin | 0 | 10 | 20 | 0 | 10 | 20 |
| Polyvinyl chloride | 100 | 100 | 100 | 100 | 100 | 100 |
| Dioctyl phthalate (plasticizer) | 50 | 50 | 50 | 0 | 0 | 0 |
| Santicizer 141 (phosphate ester type plasticizer) | 0 | 0 | 0 | 50 | 50 | 50 |
| Witco #70 (stabilizer containing barium and cadmium stearates) | 4 | 4 | 4 | 4 | 4 | 4 |

All ingredients were premixed then mixed on a 6" x 12" laboratory mill batches I and IV requiring a milling temperature of 325°–345° F. for about 35 minutes, the other batches requiring a temperature of 280° F. for 25 minutes. The calendering temperature required is about 280° F.

I claim:

1. In the method of compounding a polyvinyl chloride plastic, the steps of incorporating with such a plastic 5% to 25%, based on the weight of the plastic, of a resin consisting essentially of carbon and hydrogen, having an average molecular weight on the order of 1,000 and a refractive index of 1.544 and occurring in Utah resin-bearing coals, and milling the mixture.

2. Method of claim 1 in which the polyvinyl chloride plastic contains about 3 to 7% of copolymerized vinyl acetate.

3. Method of claim 1 in which the polyvinyl chloride plastic contains approximately 3–7% of copolymerized vinyl acetate and has a molecular weight of at least 15,000.

4. Method of claim 1 in which the milling is carried out at temperature on the order of 280° C. for 25 minutes.

5. A composition comprising a polyvinyl chloride plastic and 5% to 25%, based on the weight of the plastic, of a resin consisting essentially of carbon and hydrogen, having an average molecular weight on the order of 1,000 and a refractive index of 1.544 and occurring in Utah resin-bearing coals.

6. The composition as claimed in claim 5 in which the polyvinyl chloride plastic contains about 3 to 7% copolymerized vinyl acetate.

7. The composition as claimed in claim 5 in which the polyvinyl chloride plastic consists of the copolymer of 93–97% vinyl chloride and 7 to 3% vinyl acetate and has an average molecular weight of at least 15,000.

LINO J. RADI.

No references cited.